United States Patent
Blueml

(10) Patent No.: US 9,752,708 B2
(45) Date of Patent: Sep. 5, 2017

(54) METHOD FOR MANUFACTURING AN EXHAUST SYSTEM AND EXHAUST SYSTEM

(75) Inventor: Alfred Blueml, Erpfting (DE)

(73) Assignee: Faurecia Emissions Control Technologies, Germany GMBH, Augsburg (DE)

( * ) Notice: Subject to any disclaimer, the term of this patent is extended or adjusted under 35 U.S.C. 154(b) by 642 days.

(21) Appl. No.: 14/130,745

(22) PCT Filed: Jun. 22, 2012

(86) PCT No.: PCT/EP2012/002651
§ 371 (c)(1),
(2), (4) Date: Mar. 27, 2014

(87) PCT Pub. No.: WO2013/004352
PCT Pub. Date: Jan. 10, 2013

(65) Prior Publication Data
US 2014/0197631 A1    Jul. 17, 2014

(30) Foreign Application Priority Data

Jul. 6, 2011 (DE) .......................... 10 2011 106 801

(51) Int. Cl.
*F16L 13/08* (2006.01)
*F01N 13/18* (2010.01)
*F16L 21/08* (2006.01)

(52) U.S. Cl.
CPC .............. *F16L 13/08* (2013.01); *F01N 13/18* (2013.01); *F01N 13/1838* (2013.01);
(Continued)

(58) Field of Classification Search
CPC  F16L 13/08; F16L 21/08; F01N 13/18; F01N 13/1838; F01N 2450/22;
(Continued)

(56) References Cited

U.S. PATENT DOCUMENTS 5,799,395 A    9/1998   Nording et al.
7,743,500 B2   6/2010   Kontz
(Continued)

FOREIGN PATENT DOCUMENTS

DE            8632790        2/1987
DE    10 2005 044810 A1     3/2007
(Continued)

OTHER PUBLICATIONS

International Search Report from corresponding PCT/EP2012/002651.
(Continued)

*Primary Examiner* — David Bryant
*Assistant Examiner* — Lawrence Averick
(74) *Attorney, Agent, or Firm* — Carlson, Gaskey & Olds, PC

(57) ABSTRACT

An exhaust system is manufactured in the following manner. Initially, a plurality of pipe sections are put into each other with a clearance fit, so that connecting points are formed, at which two pipe sections overlap each other. The pipe sections then are calibrated at the connecting points, so that a narrow gap is obtained. Subsequently, the connecting points are soldered. The exhaust system thus includes a plurality of pipe sections which are put into each other and soldered to each other. Outer pipe sections of the plurality of pipe sections are calibrated.

9 Claims, 4 Drawing Sheets

(52) U.S. Cl.
CPC .......... *F16L 21/08* (2013.01); *F01N 2450/22* (2013.01); *Y10T 29/49398* (2015.01); *Y10T 29/49968* (2015.01)

(58) Field of Classification Search
CPC ............. F01N 13/1805; F01N 13/1827; F01N 13/185; Y10T 29/49968; Y10T 29/49398; Y10T 29/49885; Y10T 29/49913; Y10T 29/49925; Y10T 29/49936; Y10T 29/4998
See application file for complete search history.

(56) References Cited

U.S. PATENT DOCUMENTS

| | | | | |
|---|---|---|---|---|
| 8,100,438 B2* | 1/2012 | Grimm | ............... | F01N 13/1805 285/289.1 |
| 8,667,681 B2* | 3/2014 | Olivier | ................. | F01N 3/2803 29/890 |
| 8,850,705 B2* | 10/2014 | Steigert | .................. | B21D 53/88 123/65 EM |
| 2009/0158588 A1 | 6/2009 | Nording | | |
| 2009/0211832 A1* | 8/2009 | Grimm | ............... | F01N 13/1805 180/309 |
| 2009/0261574 A1* | 10/2009 | Blueml | ............... | F01N 13/1838 285/21.1 |
| 2010/0288391 A1 | 11/2010 | Cui et al. | | |
| 2011/0215573 A1 | 9/2011 | Tanaka et al. | | |

FOREIGN PATENT DOCUMENTS

| | | |
|---|---|---|
| DE | 102009059686 | 6/2011 |
| GB | 2383606 B | 3/2004 |

OTHER PUBLICATIONS

Summary of European Office Action with English Translation for European Application No. 12729361.1 dated Feb. 8, 2017.

* cited by examiner

METHOD FOR MANUFACTURING AN EXHAUST SYSTEM AND EXHAUST SYSTEM

RELATED APPLICATION

This application is the U.S. national phase of PCT/EP2012/002651, filed Jun. 22, 2012, which claims priority to DE 10 2011 106 801.9, filed Jul. 6, 2011.

TECHNICAL FIELD

This invention relates to a method for manufacturing an exhaust system, in particular for a motor vehicle, and to such exhaust system.

BACKGROUND

Exhaust systems usually include several components, for example exhaust manifolds, pipes, housings for catalysts and/or filters, as well as mufflers. Up to now it has been common practice to weld the exhaust-gas-conducting components to each other. This is disadvantageous, since a welding robot must guide a welding electrode around the entire circumference of the components to be welded to each other. This is a space and time consuming process. In addition, the components to be welded to each other must have a certain minimum wall thickness in order to ensure reliable welding. This minimum wall thickness is greater than the wall thickness which would be necessary with regard to the actual strength requirements.

From DE 10 2004 038 099 it is known that the components of an exhaust system also can be soldered to each other.

Further improvements are needed to provide a method with which the soldering of components of an exhaust system can be put into practice advantageously.

SUMMARY

A method for manufacturing an exhaust system includes the following steps. Initially, a plurality of pipe sections are put into each other with a clearance fit, so that connecting points are formed, at which two pipe sections overlap each other. Subsequently, the pipe sections are calibrated at the connecting points, so that a narrow gap is obtained. The connecting points then are soldered. The invention proceeds from the finding that a comparatively narrow, rather constant gap between the overlapping pipe sections is advantageous, in order to form a good soldering point. Such a narrow gap can be obtained in a variety of ways. For example, it is possible to specify very close tolerances for the manufacture of the various pipe sections, so that the pipe sections can be put into each other with a transition fit. However, this leads to rather high manufacturing costs. The invention is based on the finding that the narrow gap desired for soldering can be obtained with very little effort by calibrating the pipe sections at the connecting points after the pipe sections have been put into each other. The term "pipe section" also includes coupling sleeves which in particular can be designed with a curvature.

The particular advantage of the procedure according to the invention provides that putting the pipes into each other is easily possible due to the clearance fit. It is not necessary to apply particularly high forces, when putting the pipes together, or to even heat one of the pipes, in order to be able to put the pipe sections into each other due to the resulting thermal expansion. In general, particularly low manufacturing costs are obtained with the method according to the invention.

Preferably, it is provided that on calibrating, a pressure is applied onto the outer pipe in radial direction to the inside, so that at least the outer pipe is deformed plastically. This design is based on the finding that during the plastic deformation at the connecting point, the desired narrow gap is obtained solely by the springback of the outer pipe section. Further measures are not required. In particular, it is not required to monitor the size of the resulting gap, since due to the acting capillary forces, the solder material by itself compensates possible differences and also eccentricities.

Preferably, it is provided that the entire exhaust system is put together and all connecting points of the exhaust system are substantially calibrated at the same time. With the method according to the invention, other than in welded exhaust systems, the entire exhaust system can be pre-mounted "in one step" and subsequently be calibrated. A horizontal assembling table is particularly useful for this purpose.

Preferably, it is provided that all connecting points of the exhaust system are substantially soldered at the same time. This leads to a great time saving in the manufacture of the exhaust system. Furthermore, independent of the respective diameter, the same process time can be assumed for the soldering operation.

According to one example embodiment of the invention, it is provided that the exhaust system is soldered in a horizontal orientation. This is based on the finding that due to calibrating the connecting points, the capillary forces acting on the solder material are large enough to also uniformly distribute the material in the gap, when the same is oriented horizontally.

Preferably, a solder material has been applied at one end of a pipe section before putting the pipe sections together. This solder material, for example, can be printed, in particular by screen printing, so that no separate components such as solder rings etc. must be handled.

For the solution of the above object according to the invention there is also provided an exhaust system with a plurality of pipe sections which are put into each other and soldered to each other, wherein the respectively outer pipe sections are calibrated. Such an exhaust system can be manufactured with little effort at very low cost.

According to one example of the invention, it is provided that more than five different pipe sections are used, and in a further example, more than ten different pipe sections are used. This is based on the surprising finding that the total manufacturing effort can be reduced by constructing the exhaust system of a comparatively high number of standardized pipe sections. Other than in a welded exhaust system, in which every welding seam leads to a high manufacturing effort and high costs and therefore is avoided constructively, the individual connecting points have no disadvantageous effect in the exhaust system according to the invention, namely neither with regard to the strength nor with regard to the costs. Instead, manufacturing costs can be saved by manufacturing the exhaust systems of a large number of different types of motor vehicles by exclusively using selected pipe sections from a given construction kit of standard pipe sections. These standard pipe sections then can be pre-produced in correspondingly high numbers, so that despite the higher number of connecting points savings are obtained. In addition, these standard pipe sections need not satisfy particular requirements with regard to the tolerances, as due to calibrating after putting the pipe sections into each other a gap appropriate for soldering is ensured.

BRIEF DESCRIPTION OF THE DRAWINGS

The invention will be described below with reference to the attached drawings, in which.

DETAILED DESCRIPTION

Figure 1:
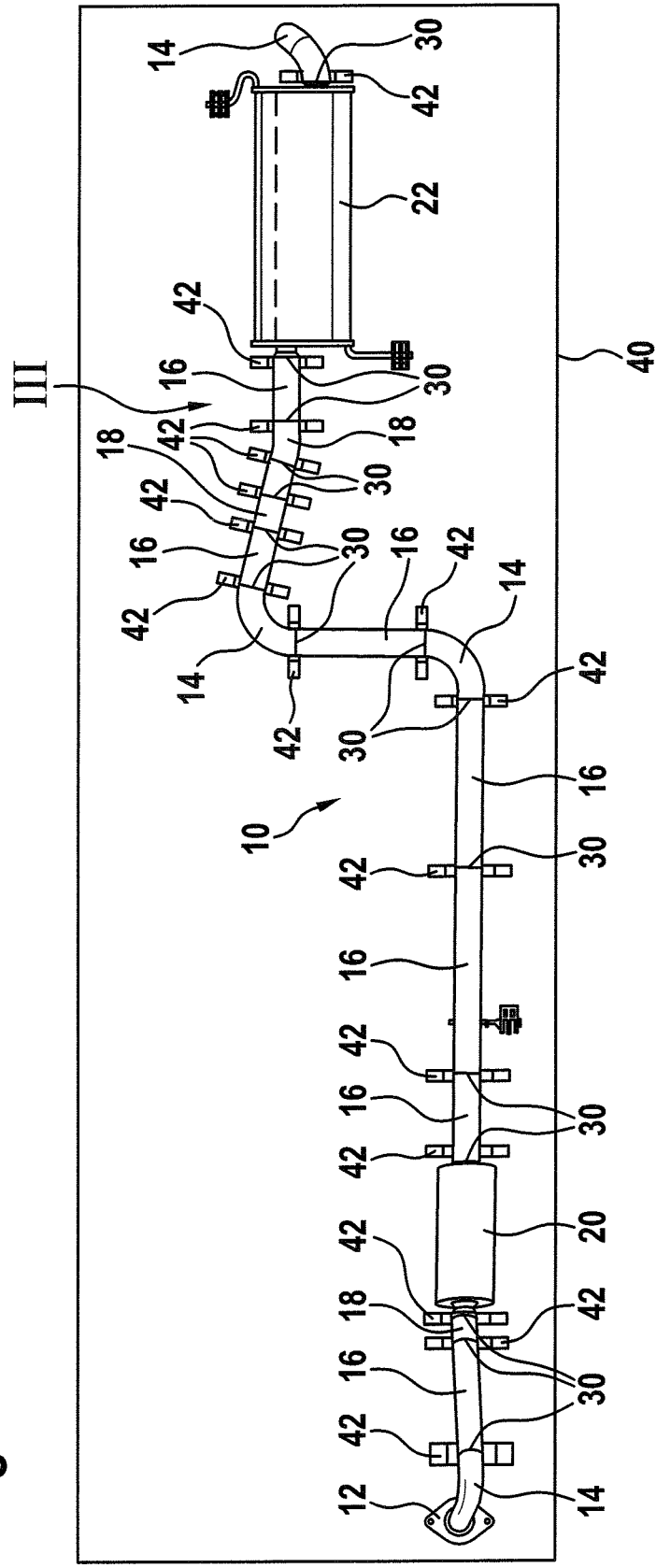
FIG. 1 schematically shows an exhaust system during the manufacture.

FIG. 1 schematically shows an exhaust system 10, which contains a connecting flange 12, several pipe elbows 14, several pipe sections 16, several coupling sleeves 18 as well as a catalyst housing 20, and a muffler 22. The pipe sections 16, as well as the pipe elbows 14 and the coupling sleeves 18, which here also are regarded as "pipe sections", are prefabricated parts of a modular system from which those parts are selected for the respective type of vehicle, with which the desired pipe route, the desired dimensions, etc. can be obtained. All pipe sections are made of sheet metal, wherein wall thicknesses in the range down to 0.6 mm are possible.

Figure 2:
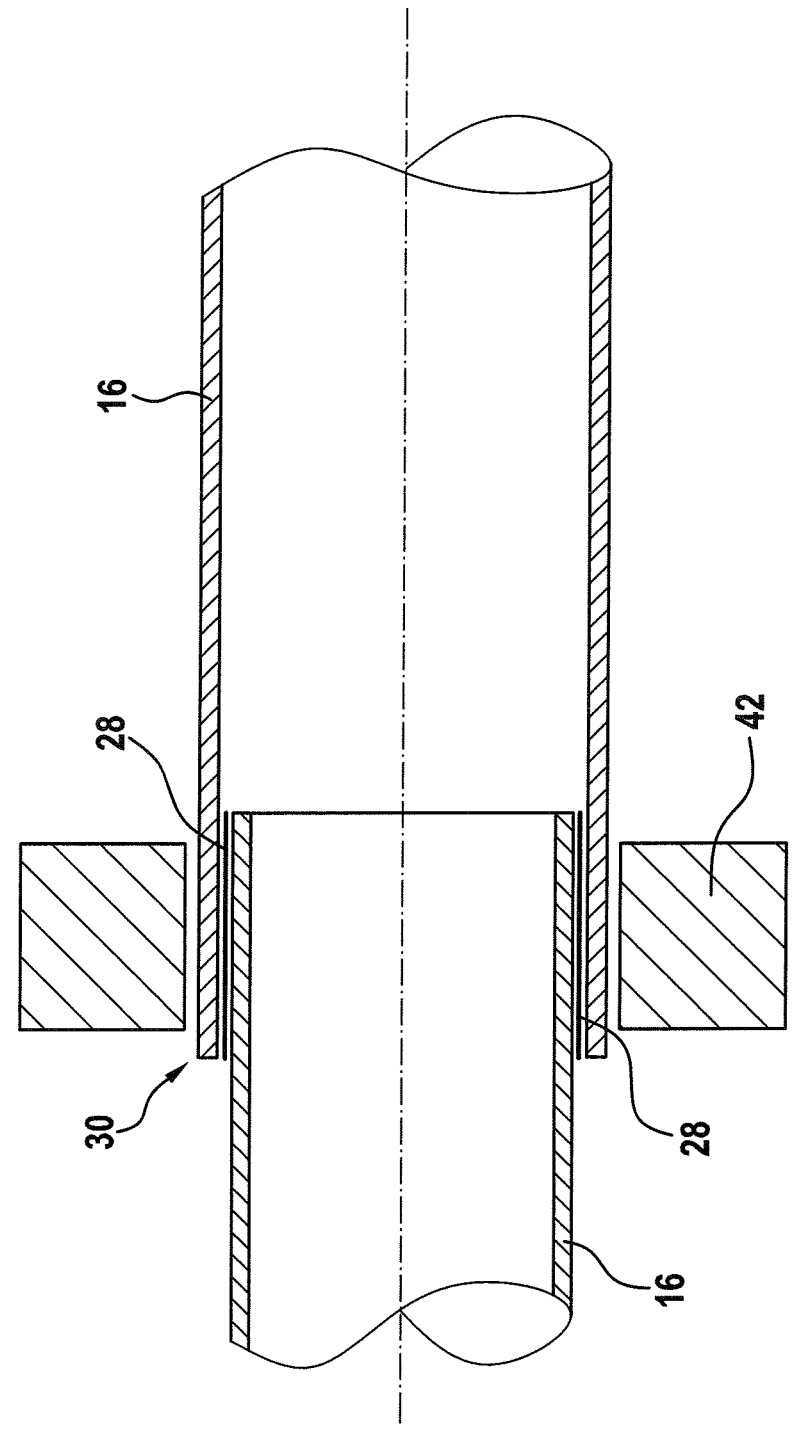
FIG. 2 schematically shows a section through the exhaust system at a connecting point which is accommodated in a holding device.
Figure 3:
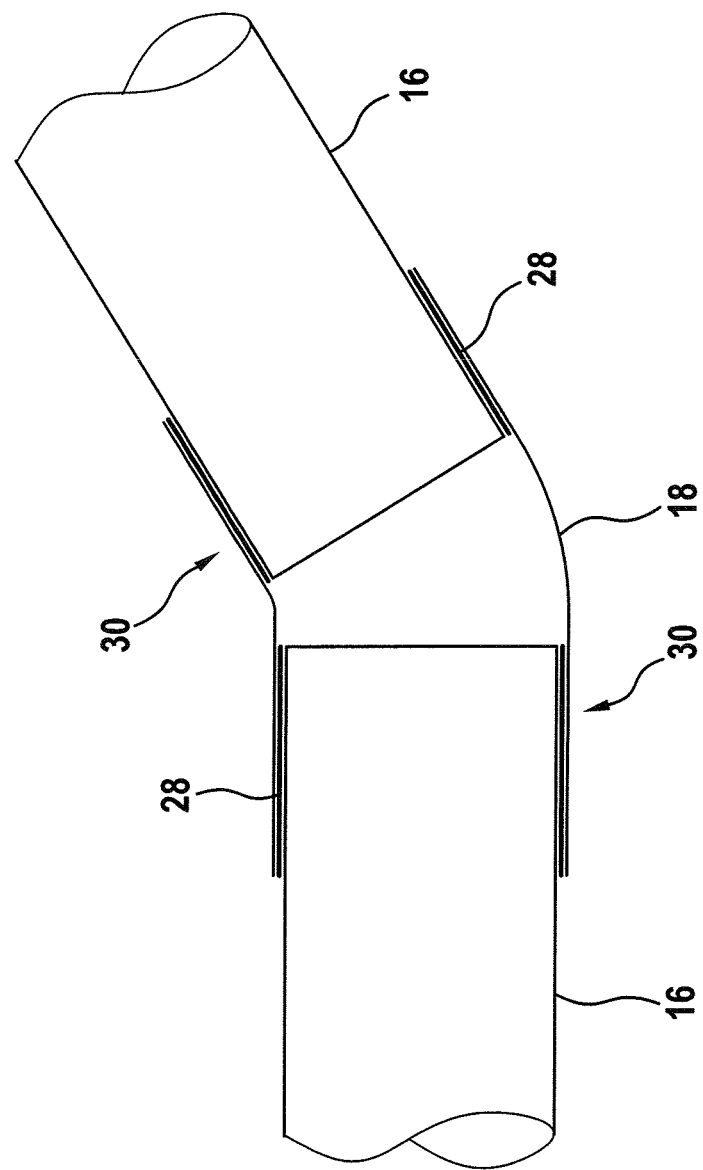
FIG. 3 schematically shows the detail III of FIG. 1.

The pipe sections are put into each other, so that a multitude of connecting points 30 is formed (see also FIGS. 2 and 3). All pipe sections are dimensioned such that they can be put into each other with a clearance fit. This provides for premounting the entire exhaust system with little effort on an assembling table 40, wherein a holding device 42 is associated with each connecting point. In the first step, the function of the holding device 42 includes suitably fixing the pipe sections.

Figure 4:
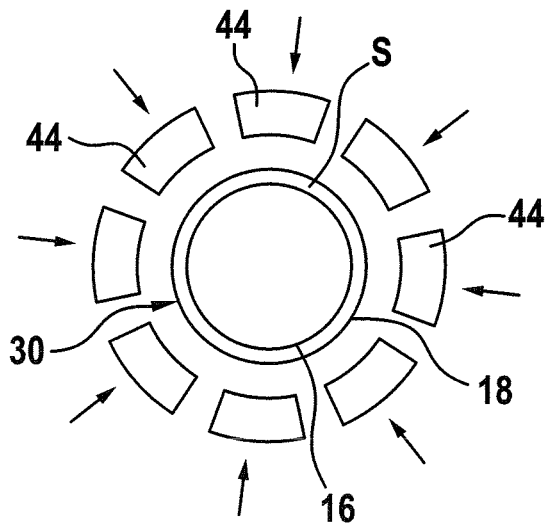
FIG. 4 schematically shows a section through a connecting point during calibrating.

As shown in FIG. 4, a comparatively large clearance S exists in the region of a connecting point 30 (shown here by way of example for a connecting point between a coupling sleeve 18 and a pipe section 16), when the exhaust system is loosely put together, i.e. in the premounted condition. This clearance S provides for easily putting the pipe sections into each other, without the individual components getting jammed or larger forces having to be applied.

Figure 5:
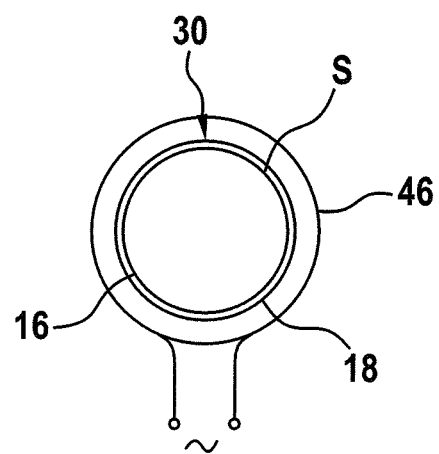
FIG. 5 schematically shows a section through a connecting point during soldering.

To fasten the individual pipe sections to each other in the region of the corresponding connecting points 30, the corresponding connecting point 30 initially is calibrated. This is shown schematically in FIG. 4, in which several pressing jaws 44 are shown, which exert a pressure acting radially to the inside on the outer pipe section, here the coupling sleeve 18, and hence indirectly also on the inner pipe section. The applied force is so high that at least the outer pipe section is plastically deformed, i.e. has a smaller inside diameter after calibrating than before. This ensures that after calibrating a comparatively narrow gap (see the smaller gap S in FIG. 5) is present, which provides for reliably soldering the pipe sections to each other.

The pressing jaws 44 can be mounted at the holding device or be integrated into the same. For example, a pair of calibration tongs can be associated to each holding device, which closes around the connecting point 30 and there applies the necessary pressure.

For the purpose of soldering, a solder ring of a solder material, in particular high-temperature solder material, can be arranged in the region of the connecting point. Alternatively or preferably, it is provided that in the region of the connecting point at least one of the pipe sections is coated with a solder material, in particular with a printed or similarly applied solder paste (see the solder material 28 schematically indicated in FIGS. 2 and 3). For soldering the pipe sections it then is provided that after calibrating, the connecting point 30 is heated, in particular by an induction device 46 (see FIG. 5) with which the connecting point 30 can be heated such that the solder material melts and after cooling reliably connects the two pipe sections with each other.

The induction device 46 also is preferably integrated into the holding device 42, so that after clamping the exhaust system on the assembling table 40, first the calibrating step and then the soldering step can be performed automatically, while the exhaust system remains fixed on the assembling table.

With regard to the productivity it is particularly advantageous that the entire exhaust system can be premounted horizontally, and in addition all connecting points can be soldered at the same time. It has no influence that depending on the concrete type of the exhaust system a very high number of connecting points 30 is present, in particular ten or more connecting points.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A method for manufacturing an exhaust system including a plurality of pipe sections, comprising the following steps:
   selecting more than ten different pipe sections from a given construction set of pre-produced pipe sections as the plurality of pipe sections;
   putting the entire exhaust system together by putting each of the plurality of pipe sections into another respective pipe section with a clearance fit, so that connecting points are formed at which two pipe sections overlap each other;
   calibrating the pipe sections at all connecting points at the same time by applying a pressure onto an outer pipe of the two pipe sections in a radial inward direction so that at least the outer pipe of each connecting point is deformed plastically and a narrow gap is obtained between the overlapping pipes; and
   soldering all of the connecting points of the entire exhaust system at the same time.

2. The method according to claim 1, wherein the exhaust system is soldered in a horizontal orientation.

3. The method according to claim 1, wherein before putting the pipe sections together, a solder material has been applied at one end of a pipe section.

4. The method according to claim 1, including associating a holding device with each connecting point, wherein the holding device suitably fixes the pipe sections.

5. The method according to claim 4, including using pressing jaws associated with the holding device to apply the pressure in a radially inward direction about the outer circumference of the outer pipe of the two pipe sections.

6. The method according to claim 5, wherein the pressing jaws are integrated into the holding device.

7. The method according to claim 5, including arranging solder material in a region of each connecting point, and simultaneously heating each connecting point such that the solder material melts and after cooling reliably connects the two pipe sections with each other.

8. The method according to claim 7, including using an induction device to heat the solder, wherein the induction device is integrated into the holding device.

9. The method according to claim 7, including using an induction device to heat the solder, wherein the induction device and pressing jaws are integrated into the holding device.

\* \* \* \* \*